United States Patent [19]

Guiotto

[11] Patent Number: 5,547,620
[45] Date of Patent: Aug. 20, 1996

[54] METHOD OF MANUFACTURING A FOOTWEAR INSOLE HAVING AN INTEGRATED COMFORT AND SUPPORT PAD

[76] Inventor: Dino Guiotto, via Bella Venezia, 5, 36078 Valdagno, Italy

[21] Appl. No.: 420,373

[22] Filed: Apr. 11, 1995

Related U.S. Application Data

[63] Continuation of Ser. No. 253,278, Jun. 2, 1994, abandoned.

[30] Foreign Application Priority Data

Dec. 1, 1993 [IT] Italy ................... VI93A0191

[51] Int. Cl.$^6$ .......................... B29C 44/06; B29C 44/12
[52] U.S. Cl. .................. 264/46.4; 264/46.6; 264/154; 264/252; 264/273
[58] Field of Search ...................... 264/153, 154, 264/273, 46.4, 46.5, 46.6, 252; 425/119

[56] References Cited

U.S. PATENT DOCUMENTS

| | | | |
|---|---|---|---|
| 1,724,349 | 8/1929 | Haag | 36/37 |
| 1,741,419 | 12/1929 | Jones | 36/145 |
| 1,785,410 | 12/1930 | Gilkerson | 36/17 R |
| 1,807,401 | 5/1931 | Gilkerson | 36/17 R |
| 1,841,942 | 1/1932 | Fenton | 36/145 |
| 1,907,136 | 5/1933 | Weitsen | 36/145 |
| 2,083,581 | 6/1937 | Silver | 36/145 |
| 2,098,235 | 11/1937 | Gilkerson | 36/17 R |
| 2,204,159 | 6/1940 | Sewall | 36/28 |
| 2,253,959 | 8/1941 | Margolin | 36/3 B |
| 2,502,774 | 4/1950 | Alianiello | 36/28 |
| 4,296,053 | 10/1981 | Doerer et al. | 264/46.4 |
| 4,316,335 | 2/1982 | Giese et al. | 36/129 |
| 4,581,187 | 4/1986 | Sullivan et al. | 264/46.4 |
| 4,657,716 | 4/1987 | Schmidt | 264/46.6 |
| 4,674,204 | 6/1987 | Sullivan et al. | 264/46.4 |
| 5,141,578 | 8/1992 | Yang | 264/46.4 |
| 5,311,677 | 5/1994 | Mann et al. | 36/107 |
| 5,318,645 | 6/1994 | Yang | 264/46.4 |

FOREIGN PATENT DOCUMENTS 52385  4/1942  Netherlands ................ 264/273

*Primary Examiner*—Allan R. Kuhns
*Attorney, Agent, or Firm*—Paul M. Denk

[57] ABSTRACT

A footwear insole having an integrated comfort and support pad and method of manufacture is disclosed. The insole is formed of a sheet material having a through opening therein and a cushion bonded to a marginal edge of the opening and to at least one side of the sheet material defining a narrow rim about the opening. The result is an integral, strong and flexible cushion insole suitable for the manufacture of particularly light and thin dress shoes. The insole may alternatively be formed with a cushion which extends in both directions beyond the thickness of the insole and is received on one side of the insole in a complementary recess of an outsole.

6 Claims, 2 Drawing Sheets

5,547,620

METHOD OF MANUFACTURING A FOOTWEAR INSOLE HAVING AN INTEGRATED COMFORT AND SUPPORT PAD

CROSS REFERENCE TO RELATED APPLICATION

This application is a continuation-in-part of U.S. patent application Ser. No. 08/253,278, filed Jun. 2, 1994, now abandoned, entitled Footwear Insole with Soft Insert.

BACKGROUND OF THE INVENTION

The present invention relates to a footwear insole and method of manufacture therefor. In particular, the invention relates to an insole formed of a sheet material having an opening therein and a soft, flexible comfort and support pad integrally molded in the opening. According to the method, a precut insole board having an opening is located in a mold having a cavity in registration with the opening. The cavity is filled to a selected level, and the mold is closed for a timed curing step.

Removable footwear inserts which sit atop the insole are known. Such inserts generally have one or more cushioned areas which provide comfort and relieve pressure on the foot. A known insert has a resilient member glued in an aperture therein. Another insole is formed with a removable portion adapted to receive a resilient member therein.

While the known support devices may be incorporated in conventional footwear without major structural or aesthetic problems, it is difficult to incorporate a comfortable, stylish and structurally sound support device in certain types of ultra-thin footwear. For example, the widely popular "décolté" style of women's footwear is particularly thin and covers only a small part of the foot. Thus, it is difficult to provide a cushioned insole which is sufficiently strong and flexible without interfering with the aesthetic features of the style.

In the décolté shoe, for example, the upper part of the shoe is reduced to a minimum and does not cover most of the foot except around the margins of the shoe. The addition of a support and cushion results in added thickness to the shoe structure and thus results in an increase in the height of the upper. Thus, an enlargement to the footwear volume becomes necessary, which enlargement is aesthetically undesirable. Similar problems also exist with respect to certain styles of men's footwear, which have a rather thin slender shape and in which it is undesirable to increase the external footwear volume.

There is presently no practical method for manufacturing a soft, flexible and sufficiently supportive element for such footwear, and which also has structural integrity. Likewise, no methods have been provided to form a shoe having an insole which incorporates such a soft, supportive, flexible and structurally integral material without unduly increasing the thickness of the insole or without the need for a supplemental insert.

It is an object of the present invention to overcome the problems of the prior art and to provide a method for manufacturing a structurally sound insole having relatively little overall thickness yet providing cushioning, flexibility and sufficient foot support.

It is also an object of the invention to provide a method for manufacturing an insole having areas of flexibility and softness and which may be employed in any insole for any model of shoe, including the ultra-thin, elegant popular styles.

SUMMARY OF THE INVENTION

The present invention is based upon the discovery that a thin, structurally sound, supportive and padded insole for footwear may be provided by forming an aperture in an insole board and molding and curably bonding a flexible cushion forming material to the board in the aperture. The flexible cushion forming material may be of any of various foam plastics, such as polyurethane flexible foam.

According to one embodiment of the invention, a pre-cut insole board, formed of sheet stock and having a through opening, is placed in a mold having a cavity therein defining a cushion area overlapping one of the sides of the insole and adjacent the opening. The cavity is filled to a selected level with a curable foam material, the mold is closed and the material cures and bonds to the insole board thereby forming an integrated structure.

According to the invention, the filling step includes limiting the filling so that during the curing step the flexible material expands and fills the aperture. A portion of the material overlaps the edge of the opening to bond to the edge and side of the aperture. The resultant insole is flexible and thin, yet provides a structurally sound, shock-absorbing insole.

DESCRIPTION OF THE INVENTION

Figure 1:
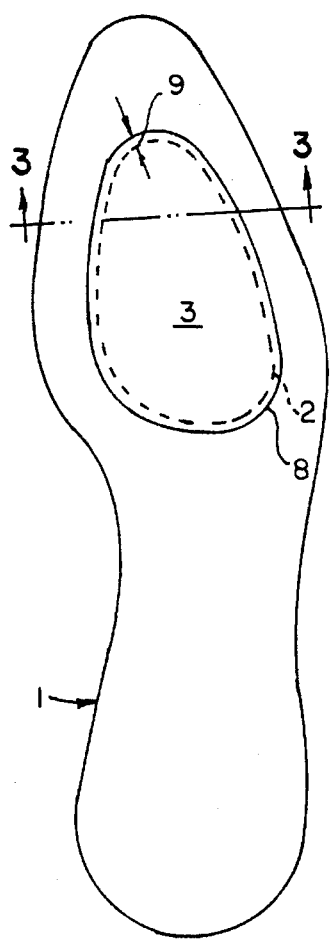
FIG. 1 is a top plan view of an insole manufactured according to the present invention shown laminated to an outsole.
Figure 2:
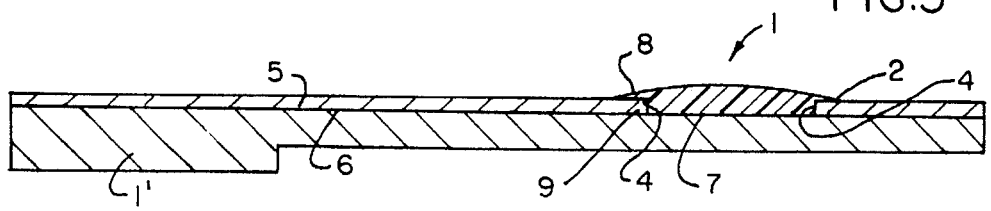
FIG. 2 is a view showing the lamination of the insole and an outsole.
Figure 3:
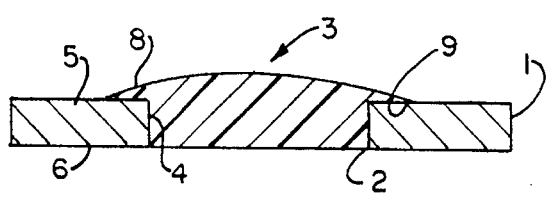
FIG. 3 is a sectional view taken along line III—III of FIG. 1.

With reference to FIGS. 1–3, an insole may be formed by die-cutting sheet stock to the desired shape of an insole board. The insole 1 is shown bonded to an outsole 1'. The stock material may be an appropriate type of pressboard suited to repel water or perspiration. An opening 2 is formed in the insole board 1 which corresponds to the sole area of the foot. The opening 2 has a marginal edge 4 and the stock material has a respective top and bottom 5 and 6. The opening 2 is filled by pouring or injecting a polyurethane foam therein to form a cushion 3. The insole 1 may be laid on a flat surface so that the polyurethane foam forms a flat bottom 7 and flows over the edge 4 onto the top surface 5 of the opening 2 thereby acquiring the shape shown in the drawing. The flat bottom surface 7 of the cushion 3 is substantially flush with the bottom surface 6 of the stock material.

FIG. 2 particularly illustrates the insole 1 formed with the cushion 3 of polyurethane foam and bonded to the stock material in the opening 2. It can be seen from FIGS. 2 and 3 that the material, for example, polyurethane foam is molded so as to provide a flange 8 which extends without interruption onto the top surface 5 about the marginal edge 4 of the opening 2 to define a rim portion 9. During the curing step, the material bonds and is thus anchored to the upper surface 5 of the stock material along the rim 9 of the opening 2. The flange 8 of the cushion 3, as seen in FIGS. 2 and 3, for example, securely bonds the cushion 3 to the insole 1. In the embodiment illustrated in FIG. 2, the bottom 7 of the cushion 3 is flush with the bottom surface 6 of the insole 1.

A small seepage of the material forming the cushion 3 can occur during the pouring step so that some of the cushion material bonds to the bottom surface 6 of the insole 1 to further anchor the cushion 3 to the insole 1. As can be seen, the total thickness of the cushion 3 results in only a small increase in the relative thickness of the insole itself. However, when the foot rests on and exerts pressure on the insole, it is not only padded by the cushion but it is supported by the full thickness more or less equal to that of the insole. In addition, the cushion 3 is flexible and strongly bonded to the insole material. Thus, the resulting insole 1 achieves flexibility and strength without appreciable or observable change in shoe volume. In this way, even with a small thickness exceeding the upper surface of the insole, improved softness and flexibility are achieved.

It can also be appreciated that the removal of insole material to form the opening 2 renders the insole more flexible. This is because the most rigid part of the insole, that is, stock material or pressboard, is removed along the center of the insole at one or more locations. Thus, where the stock material forming the insole is removed and replaced by a material such as polyurethane or other similar soft, flexible foam material, great flexibility is achieved. Thus, insoles of the present invention can be used to great advantage in footwear of the décolté type which requires such flexibility.

Figure 4:
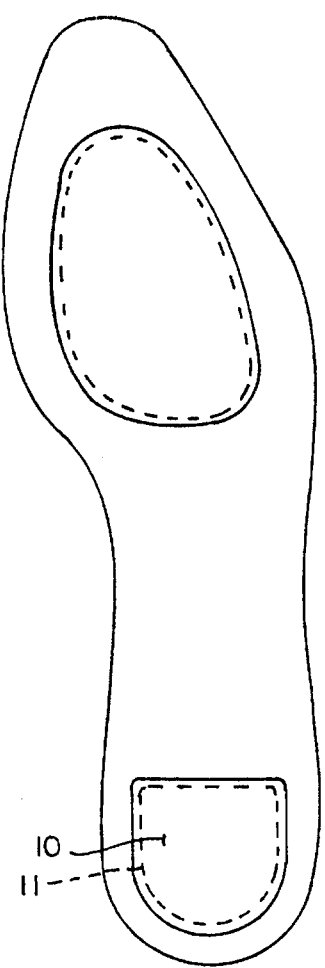
FIG. 4 is a top plan view of an insole manufactured according to the present invention having two areas filled with flexible material corresponding to the sole and heel areas.

As illustrated in FIG. 4, a cushion 10 may be provided in the heel area resulting in increased shock absorbing comfort and support thereat. An opening 11 corresponding to the heel portion of the insole board is filled in the same way as the opening 2, and likewise, is filled with a similar material which is soft, strong and flexible to form a heel cushion 10.

Figure 5:
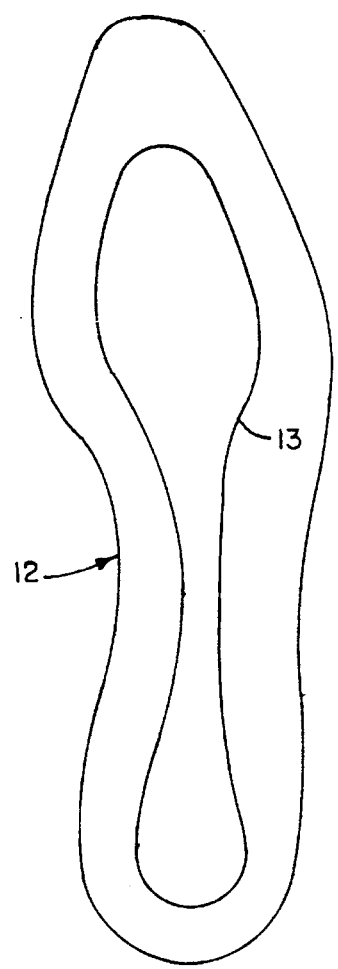
FIG. 5 is a top plan view of an insole board for an insole according to the present invention having a single opening which extends from the foot sole area to the heel area.

In another embodiment of the invention, shown in FIG. 5, an insole 12 is formed with an opening 13 which extends continuously from the foot sole area to the heel area. An elongated cushion (not shown) may be formed in the opening 13 in the manner set forth above. Such a design thus provides great flexibility which is particularly needed in high heel shoes for women, and yet remains strong and integral.

Figure 6:
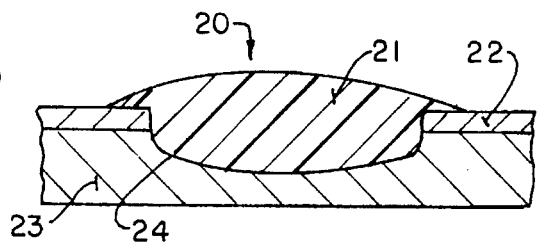
FIG. 6 illustrates a fragmentary sectional view of an alternative insole bonded to an outsole having a thickened cushion that extends into a cavity in the outsole.

According to yet another embodiment of the invention, as shown in FIG. 6, the insole 20 may be formed with a cushion 21 which extends in both directions beyond the thickness of the insole board 22. The outsole 23 may be formed with a complementary recess 24 to receive the enlarged cushion material.

Figure 7:
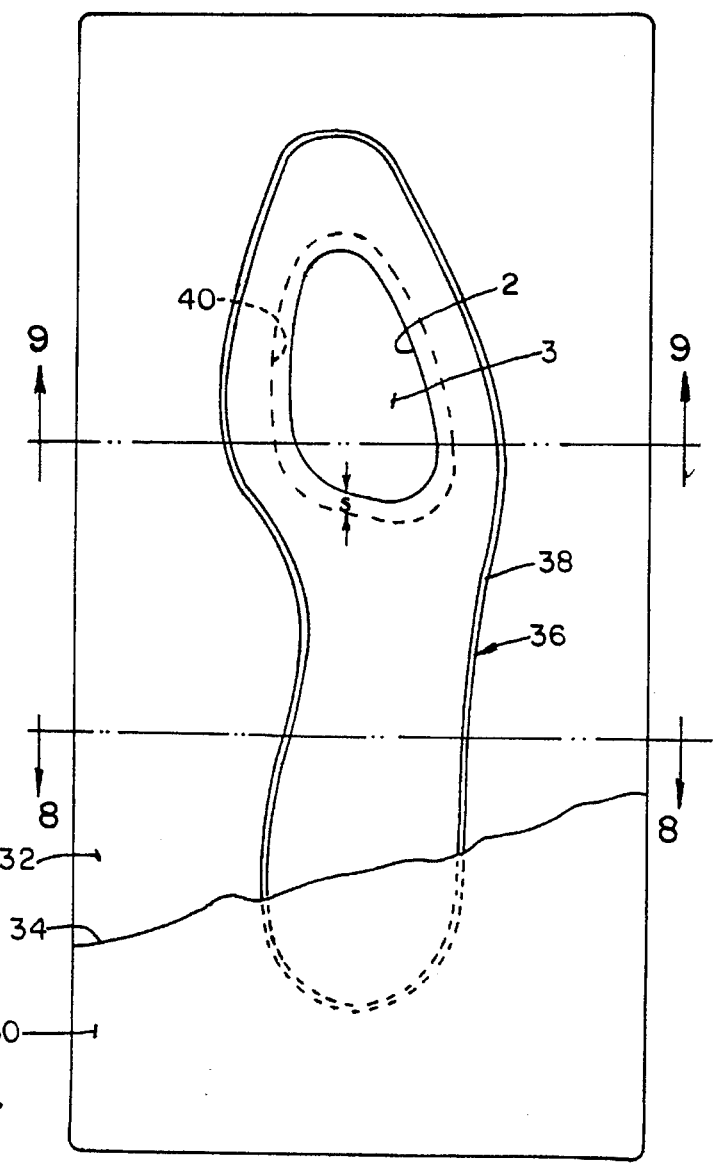
FIG. 7 is a plan view of a mold employed in carrying out the method according to the present invention.
Figure 8:
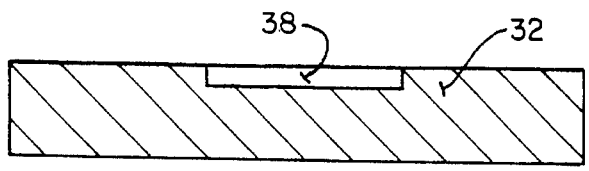
FIG. 8 is a sectional view of the mold taken along VIII—VIII of FIG. 7.
Figure 9:
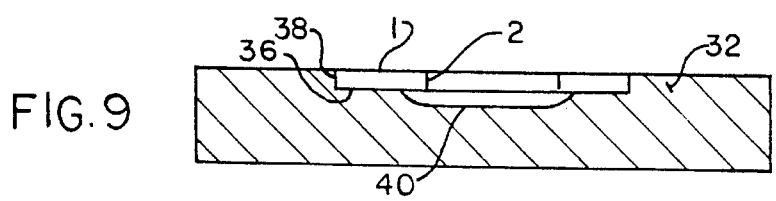
FIG. 9 is a sectional view of the mold taken along IX—IX of FIG. 7.

Manufacture of the insole, according to the various embodiments discussed hereinabove, may be accomplished by a molding process. According to one embodiment of the invention, illustrated in FIGS. 7–9, a mold 30 suitable for manufacturing an insole such as the structure illustrated in FIG. 2 includes mold halves 32 and 34. The mold half 32 may be formed with a stepped mold cavity 36. The mold cavity 36 includes a recess 38 for receiving the pre-cut stock material and a cavity 40 which is adjacent the insole receiving portion 38 and which is formed with a shape that is similar to that of the aperture in the insole, but is spaced outwardly of the aperture a predetermined distance S all the way around the aperture as seen in FIG. 7 which illustrates the insole inserted within cavity 38 of the mold. The cushion material receiving portion 40 of the cavity 36 is located in the footsole portion, as shown in FIG. 7. The mold top 34, in the embodiment described herein, is a flat plate which may be disposed over the mold bottom 32 and cover the mold cavity 36.

In accordance with the invention, the pre-cut stock material forming the insole is located in the corresponding recess 38 of the mold cavity 36 with the aperture or opening 2 located over and in registration with the cushion material receiving portion 40 of the cavity 36. The cushion forming material is poured into the cavity 36 through the opening 2 and may be filled to a level sufficient to allow the material to expand on curing so as to fill the remaining open portions of the mold and to form the flat bottom portion which is illustrated in FIG. 2. As particularly illustrated in FIG. 9, the insole stock material is located in the corresponding cavity 38 and the filler material is located in the corresponding cavity portion 40 and in the aperture 2. The cushion material thus bonds to the stock material along the margin for the aperture 2 and along the rim 9 in the flange portion 8 of the cushion 3. Some of the cushion filler material may seep along the inverted bottom side 6 of the stock material to further secure the filler material to the stock material upon curing. Further, some of the filler material may migrate into the stock material, for example, in the case of relatively porous material, and thereby further improve the bonding of the filler material to the stock material so that a strong integral structure is produced. Such a result may be facilitated by use of a fibrous cardboard or textile stock material which is sufficiently porous to allow the filler material to migrate therein. In addition to fibrous cardboard or textile materials, the stock material may be woven or nonwoven textile, plastic, leather, synthetic leather or other suitable material. The particular rigidity and strength of the stock material may be varied for the particular application.

In accordance with the invention, the filler material may comprise a polyurethane foam formed of 100 parts by weight polyol and isocyanate in an amount in a range of about 27 and 47 parts by weight. In a particular embodiment, the filler material comprises 100 parts by weight polyol and about 37 parts by weight isocyanate. It is advantageous to maintain the mold 30 in a temperature range of between about 40° and 50° C. while using such material.

In accordance with the present invention, the method for manufacturing an insole having the particular desired properties comprises the steps of forming a pre-cut insole board with an aperture therein; locating the insole board in a mold having a cavity for receiving filler material in registration with the aperture; filling the mold cavity with the cushion forming material; closing the mold and curing the cushion forming material for a time and at a temperature sufficient to result in curing the cushion material and bonding the same to the insole to thereby form an integral structure. In a particular embodiment, the mold cavity is filled to a level sufficient to permit the cushion forming material to fill the mold cavity and the aperture. In a continuous process, the insole may be cut from a web after the molding step. In one embodiment, the cushion that is formed has a surface flush with one side of the insole board and extends above the opposite surface thereof to form a raised portion with a flange that extends along a rim adjacent the aperture.

The rim 9 surrounding the aperture may have a width in a range of about 1 to about 10 millimeters, preferably the rim portion is in a range of about 2 to about 6 millimeters. The rim 9 extends a relatively uniform distance from the edge 4 of the aperture 2. The mold may be maintained closed for curing for a period in a range of about 150 and 180 seconds. It is preferred to reduce the curing time to as short a period as necessary to achieve the purpose. For the polyurethane material hereinabove described, the cure time is about 150 seconds.

Figure 10:
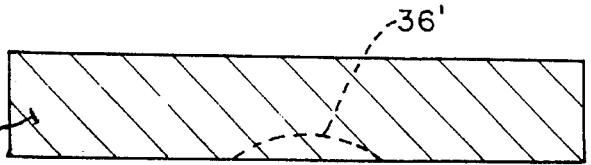
FIG. 10 is a sectional view of the mold top.

In accordance with another embodiment of the invention, the mold top 34 may be formed with a cavity 36' (shown in phantom line in FIG. 10). The cavity 36' would, if used in the embodiment of FIG. 1, be in registration with the aperture 2 and allow for the formation of the cushion in the shape shown in FIG. 6.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed is:

1. A method for manufacturing a footwear insole with an integral comfort and support pad comprising the steps of:

cutting insole sheet stock material having opposite sides to form a pre-cut insole board;

forming a through opening in said insole sheet material, said through opening defining an inner peripheral edge;

providing a mold including a cavity defining an insole receiving portion and a curable material receiving portion;

placing the pre-cut insole within said insole receiving portion of the cavity with the material of said insole adjacent said inner peripheral edge overlapping said curable material receiving portion of the mold cavity by a predetermined distance, said predetermined distance is generally in the range of between about 1 and about 10 mm;

introducing curable material into the curable material receiving portion of the cavity, said curable material comprises polyol and isocyanate in amounts in a range of between about 27 and 47 parts by weight isocyanate per 100 parts by weight polyol;

closing the mold, maintaining the mold at a temperature in a range of between about 40° C. and 50° C. during the introducing step, maintaining said mold closed for a time sufficient to allow the curable material to cure, said time is in a range of between about 100 and about 180 seconds after the introducing step;

allowing the curable material to cure and bond to the inner peripheral edge of the opening and to the material of said insole adjacent said inner peripheral edge in said overlapping by a predetermined distance, wherein said predetermined distance being in the range between about 2 and about 6 mm, thus forming an insole with comfort and support pad integrated therein.

2. The method according to claim 1 wherein the curable material comprises a polyol-isocyanate material having about 37 parts by weight isocyanate per 100 parts by weight polyol.

3. The method according to claim 1 wherein the time is about 150 seconds after the introducing step.

4. The method according to claim 1 including providing a cavity in the mold on a side of the insole opposite to the side of the insole adjacent said curable material receiving portion of the mold cavity.

5. The method according to claim 1 wherein the predetermined distance by which the inner peripheral edge of the pre-cut insole board overlaps the curable material receiving portion of the mold cavity is from about 2 to 6 mm.

6. The method according to claim 1 wherein during the introduction of curable material into the curable material receiving portion of the cavity, a portion of the curable material bonds to a side of the pre-cut insole board opposite the curable material receiving portion of the cavity to further anchor the support pad to the footwear insole.

* * * * *